United States Patent Office 2,822,391
Patented Feb. 4, 1958

2,822,391

AMINOALKYLOXYALKYL ETHERS OF SALICYLAMIDE

Hans Suter, Dorflingen, and Werner Kündig, Schaffhausen, Switzerland, assignors to Eprova Limited, Schaffhausen, Switzerland No Drawing. Application August 3, 1954
Serial No. 447,669

Claims priority, application Switzerland August 15, 1953

2 Claims. (Cl. 260—559)

This invention relates to new derivatives of salicylic acid amides which are effective as antipyretic and analgetic therapeutics. The invention also relates to process for the production of these new compounds and therapeutics.

The invention provides new ethers of salicylic acid amide of the general formula:

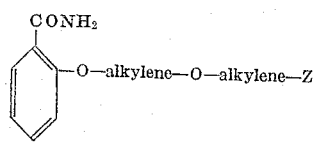

in which alkylene represents lower alkylene radicals, Z represents a hydrogen atom or a hydrophilic group which is a primary, secondary, tertiary or quaternary amino or ammonium group or a sulphonic acid group; and salts of said ethers with one another or with inorganic and organic bases and acids; and quaternary salts of said ethers.

As distinguished from the numerous derivatives of salicylic acid amide hitherto known and the salicylic acid amide itself, the new ethers of the invention and their salts are distinguished by good solubility in water.

It has been found that these substances and their salts have valuable analgesic and anti-rheumatic properties, which is surprising inasmuch as hitherto the introduction of hydrophilic groups into salicylic acid amide has always led to a complete loss of activity.

In particular the amino and ammonium compounds are distinguished by a surprisingly strong-anti-pyretic, analgesic and in some cases anaesthetic activity. The strength, duration and character of the activity can be varied by varying the particular structure of the basic group, which may be a primary, secondary, tertiary or quaternary group.

The new compounds are intended for use as active substances for the production of medicaments, and in some cases also as intermediate products. Agents which promote the activity of or conserve the new compounds may also be added. Their solutions can be sterilised without destruction of the active components.

Mixtures of the new compounds of the invention can also be used with advantage. In this way it is possible, for example, to obtain an activity which sets in rapidly but at the same time persists for a long time and diminishes only slowly. The breadth of effect can also be increased by this measure.

The combination of salicylic acid amide derivatives of the invention containing the sulphonic acid group with salicylic acid amides carrying the corresponding amino groups has proved to be of interest. Since the sulphonic acid group and the amino group combine to form a water-soluble salt, this new combination enables water-soluble preparations to be produced without further additions of acids or bases, which preparations show the combined effects due respectively to the amino compound and the sulpho compound.

The new compounds can be produced by methods known per se.

One process consists in reacting salicylic acid amide or its sodium or potassium salt with a reactive ester, for example a hydrogen halide ester, of an alcohol of the formula:

alkylene and Z having the above-defined meanings, and converting the group Z in the ether so obtained into a salt or quaternary salt in known manner.

In the above-described process the reaction can also be carried out with a compound in which Z has been replaced by a reactive ester group, which is converted in a second stage by an aminating agent, for example ammonia, primary, secondary or tertiary amines, or hexamethylene tetramine, into a primary, secondary, tertiary or quaternary amino or ammonium group. The reactive ester group which replaces Z is reacted with salts of sulphurous acid to form the sulphonic acid derivatives or is caused to react with thio-urea. The product of the reaction with thio-urea is converted into the sulphonic acid by subsequent oxidation to the sulphonyl chloride and saponification thereof.

The above-described processes can be carried out with salicylic acid esters in place of salicylic acid amide. In this case the compounds of the invention are obtained by subsequent reaction of the ester group with an amidating agent to form the acid amide group, in a last stage or especially in a suitable intermediate stage.

The invention further includes analgesic, anaesthetic, anti-pyretic and anti-rheumatic preparations containing the salicylic acid amide derivative of the invention, if desired in combination with one another or with known components which promote or complete the activity or have a conserving action.

The new therapeutics can be employed as aqueous injection solutions—produced by dissolving the new substances or their salts, if desired with additions, in water—or as oily solutions or suspensions for special local application of long duration, or after appropriate working up in solid or semi-solid form as tablets, pills, dragees, sticks, suppositories or salves.

Example 1

41.1 g. (0.3 mol) of salicylic acid amide are added to 6.9 g. (0.3 gram-atoms) of sodium in 150 cc. of ethanol followed by a thin stream of 215 g. (1.5 mol) of β,β'-dichlordiethyl ether with mechanical stirring. The reaction mixture is boiled vigorously under reflux for six hours. It is then allowed to cool and the precipitated sodium chloride is separated by suctional filtration and washed with benzene.

Yield: 16 g., i. e. 91% of the theoretical.

The ethanol and benzene filtrates are together washed repeatedly with saturated sodium carbonate solution and water, dried and freed from solvent and excess dichlordiethyl ether on a boiling water bath under vacuum. The residue solidifies on trituration with ligroin to form colorless crystals melting at 60 to 65° C.

Yield: 62.5 g., i. e. 85% of the theoretical.

By repeated recrystallization from benzene/ligroin (B. P. 60 to 90° C.) 2β(β'-chlorethoxy)-ethoxy-benzamide is obtained in the form of beautiful needles of melting point 63.5 to 64° C. The compound dissolves readily in hot methanol, ethanol, acetone, ethyl acetate and benzene but sparingly in hot ligroin and water.

In the same way as described in the above example, the sodium salt of salicyclic acid amide, obtained from 20.55 g. (0.15 mol) of salicyclic acid amide and 3.45 g. (0.15 gramatom) of sodium in 80 cc. of butanol, can be converted into 2[δ(δ'brom-butoxy)-butoxy]-benzamide by reaction with 216 g. (0.75 mol) of δ,δ'-dibromdibutyl ether by boiling for twelve hours under a reflux condenser.

In a manner analogous to that described in Example 1 63 g. of 2[β(δ'-brom-butoxy)-ethoxy]-benzamide, i. e. 86.5% of the theoretical, are obtained by reacting 130 g. (0.5 mol) of δ-brom-butoxy-ethyl bromide with 0.25 mol of the sodium salt of salicyclic acid amide in ethanol.

*Example 2*

13.7 g. (0.1 mol) of salicylic acid amide and 11.9 g. (0.11 mol) of 2-ethoxy-ethyl chloride are added to 2.3 g. (0.1 gram-atom) of sodium in 100 cc. of ethanol and the reaction mixture is boiled for twenty-four hours under reflux with exclusion of moisture. It is then evaporated to dryness in vacuo and the residue is shaken with 2N sodium hydroxide and benzene. The benzene solution is separated, washed with water, dried and evaporated. The residue crystallizes on trituration with ligroin to form little needles melting at 76° C.

Yield: 8 g., i. e. 38% of the theoretical.

By recrystallization from 20 to 30 cc. of carbon tetrachloride the 2(β-ethoxy-ethoxy)-benzamide is obtained in the form of beautiful colorless little needles. On heating at 71 to 72° C. on a Kofler block the needles are transformed into cubes which finally melt at 78 to 79° C. The compound is sparingly soluble in the cold in hydrocarbons, butyl ether and water. It dissolves in cold butanol, boiling carbon tetrachloride and hot butyl ether. It is very readily soluble in methanol, ethanol and ethyl acetate.

2[β-n-butoxy-ethoxy]-benzamide is obtained by the process described in Example 2 in good yield by reacting 20 g. (0.11 mol) of 2-n-butoxy-ethyl bromide with 0.1 mol of sodium salicylic acid amide.

*Example 3*

24.3 g. (0.1 mol) of 2[β(β'-chlorethoxy)-ethoxy]-benzamide and 27.7 g. (0.11 mol) of $Na_2SO_3 \cdot 7H_2O$ in 50 cc. of water are boiled under reflux for eight hours with vigorous mechanical stirring. Only a slight turbidity remains. The solution is filtered and the filtrate is extracted repeatedly with benzene and chloroform. The aqueous solution is evaporated to dryness and the residue is boiled out twice with ethanol 19 g., i. e. 61% of the theoretical of the sodium salt of 2[β-(β'-sulphoethoxy)-ethoxy]-benzamide remain behind.

The compound can be purified by dissolving in 50 cc. of water and carefully adding ethanol (250 cc.) to the aqueous solution. In this way colorless little needles are obtained which are transformed slowly at 108° C. into spherolites. The latter melts at 199 to 201° C.

Yield, pure material: 18 g. corresponding to 58% of the theoretical.

*Micro-analysis.*—Calc.: N, 4.49%; S, 10.28%. Found: N, 4.72%; S, 10.68%.

The free acid obtained from the sodium salt and concentrated hydrochloric acid melts at 172 to 175° C. It is readily soluble in water.

In a manner analogous to that described in Example 3 20.5 g. of the sodium salt of 2[β(δ'-sulphobutoxy)-ethoxy]-benzamide are obtained from 29.2 g. (0.1 mol) of 2[β(δ'-brombutoxy-ethoxy]-benzamide and 27.7 g. (0.11 mol) of $Na_2SO_3 \cdot 7H_2O$ in 60 cc. of water and 25 cc. of ethanol by heating for ten hours under pressure to 115 to 120° C.

*Example 4*

1 g. of 2[β(β'-chlorethoxy)-ethoxy]-benzamide, 1.8 g. of ethylamine and 10 g. of benzene are heated in a tube for fourteen hours to 140° C. The reaction solution is evaporated, the residue is dissolved in 1 N hydrochloric acid, the solution is washed with benzene and excess of concentrated sodium hydroxide solution is added. The oily base which separates is taken up in benzene, washed with water, dried and evaporated. The residue (1 g.) is distilled in a little flanged cylinder at 150° C. external temperature and 0.005 mm. Hg pressure. A light yellow oil is obtained readily soluble in organic solvents. The picrate, when recrystallized from ethanol, melts at approximately 148° C., transformation into another crystal form takes place at 138 to 142° C.

Micro-analysis gives values of the C, H and N contents which agree satisfactorily with those calculated for the picrate of 2[β(β'-ethylamino-ethoxy)-ethoxy]-benzamide.

In the same way 2[β(β'-butylamino-ethoxy)-ethoxy]-benzamide can be obtained by reacting 2 g. of 2[β(β'-chlorethoxy)-ethoxy]-benzamide with 6 g. of n-butylamine in benzene.

*Example 5*

3 g. of 2[β(β'-chlorethoxy)-ethoxy]-benzamide in approximately 20 cc. of liquid ammonia are maintained in a closed vessel for twenty-three hours at 70° C. and thereafter for twenty-four hours at room temperature. The clear solution obtained is evaporated at room temperature, whereafter a colorless oil contaminated by ammonium chloride remains.

On addition of 2 N hydrochloric acid 0.3 g. (i. e. 10% of the theoretical) of the pure hydrochloride of bis-[β(β' - 2 - aminocarbonyl-phenoxy-ethoxy)-ethyl]-amine precipitates. This hydrochloride is sparingly soluble even in boiling water. After recrystallization from 6 N acetic acid, colorless needles are obtained melting at 178 to 179° C. The hydrochloric acid filtrate is treated with an excess of concentrated sodium hydroxide solution and extracted rapidly with chloroform; the extract is dried and evaporated. The residue, crude [β(β' - amino - ethoxy)-ethoxy]-benzamide, is a colorless oil which dissolves readily in cold water and dilute mineral acids. Crude yield: 2.4 g., i. e. 87% of the theoretical. The picrate can be precipitated from an acetic acid solution by addition of aqueous picric acid solution. The picrate, after being twice recrystallized from 6 N acetic acid, melts at 212 to 213° C., after individual small droplets have formed at 205° C.

2[β(β'-amino-ethoxy)-ethoxy]-benzamide can also be produced by hydrogenolytic decomposition of the corresponding dibenzyl compound (see Example 8 below).

*Example 6*

2 g. of 2[β(β'-chlor - ethoxy) - ethoxy] - benzamide, 3 g. of diethylamine and 10 cc. of benzene are heated in a tube for eighteen hours to 100° C. The reaction solution is evaporated, the residue is dissolved in 10 cc. of 2 N hydrochloric acid, the solution is washed with benzene and treated with 10 cc. of 30% sodium hydroxide solution. The basic components are taken up in benzene, the benzene solution is washed with water, dried, decolorized with activated carbon and evaporated. The residue (1.7 g. of a light brown oil) crystallises after standing for a long period in the ice chest. 2[β(β'-diethylamino-ethoxy)-ethoxy]-benzamide is obtained by repeated recrystallisation from approximately 200 cc. of petroleum ether (B. P. 40 to 60° C.) in the form of very beautiful centimeter-long colorless needles of melting point 47 to 47.5° C. The yield is 1.6 g., i. e. 69% of the theoretical. N-content: calc.: 9.99%, found: 10.01%. The compound is readily soluble in dilute mineral acids, acetic acid, citric acid and tartaric acid, also in methanol, ethanol, acetone, chloroform and benzene. The compound is very sparingly soluble in water and cold petroleum ether.

4 g. of 2[δ(δ'-brom-butoxy)-butoxy]-benzamide are converted into 2[δ(δ'-diethylaminobutoxy)-butoxy]-benzamide by heating with 6 g. of diethylamine and 20 cc. of benzene under pressure to 120 to 130° C. in a similar manner to that described in Example 6.

In a similar manner 2[β(δ'-diethylamino-butoxy)-ethoxy]-benzamide is produced by reacting 10 g. of diethylamine with 5 g. of 2[β(δ'-brom-butoxy)-ethoxy]-benzamide.

10 g. of 2[β(β'-chlorethoxy)-ethoxy]-benzamide are reacted with 14 g. of methyl-ethylamine in 45 cc. of benzene as described in Example 6. 8 g. of 2[β(β'-methyl-ethylamino-ethoxy)-ethoxy]-benzamide are obtained.

In the same way 7 g. of 2[β(β'-dimethylamino-ethoxy)-ethoxy]-benzamide are obtained from 10 g. of 2[β(β'-chlorethoxy)-ethoxy]-benzamide and 12 g. of dimethylamine.

4 g. of 2[β(β'-chlorethoxy)-ethoxy]-benzamide and 7 g. of β-phenyl-ethylamine give 3.2 g. of 2[β(β'-phenyl-ethylaminoethoxy)-ethoxy]-benzamide.

Example 7

1 g. of 2[β(β'-chlorethoxy)-ethoxy]-benzamide, 1 g. of piperidine and 10 cc. of benzene are heated in a tube for fourteen hours to 140° C. The piperidine hydrochloride which separates is filtered off with suction and washed with benzene. The benzene solution is evaporated. The residue (1.1 g. of crude oil) is dissolved in 10 cc. of 2 N hydrochloric acid, washed with benzene and made alkaline with 15 cc. of 2 N sodium hydroxide solution. The base which separates is extracted with chloroform. The extract is washed with water, dried and evaporated. The residue crystallizes on scratching with a glass rod. After repeated recrystallization from petroleum ether 0.5 g. of 2[β(β'-N-piperidino-ethoxy)-ethoxy]-benzamide are obtained of melting point 72 to 72.5° C.

*Micro-analysis.*—Calc.: C, 65.27%; H, 8.27%; N, 9.58%. Found: C, 65.58%; H, 8.02%; N, 9.79%.

The compound is readily soluble in dilute mineral acids, dilute acetic acid and also in methanol, ethanol, ether and benzene. It is sparingly soluble in petroleum ether and water.

0.55 g. of 2[β(β'-N-2'-methyl-piperidino-ethoxy)-ethoxy]-benzamide are produced by the process described in the foregoing example by reacting 1 g. of 2[β(β'-chlorethoxy)-ethoxy]-benzamide with 1 g. of 2-methyl-piperidine in 10 cc. of benzene.

The reaction of 1 g. of 2[β(β'-chlorethoxy)-ethoxy]-benzamide with 1 g. of morpholine in benzene gives 2[β(β'-N-morpholino-ethoxy)-ethoxy]-benzamide.

The reaction of 1 g. of 2[β(β'-chlorethoxy)-ethoxy]-benzamide with 0.9 g. of pyrrolidine gives in analogous manner 2[β(β' - N - pyrrolidine-ethoxy)-ethoxy]-benzamide.

Example 8

2 g. of 2[β(β'-chlorethoxy)-ethoxy]-benzamide, 3.6 g. of dibenzylamine and 10 cc. of benzene are heated in a tube for fourteen hours to 140° C. The dibenzylamine hydrochloride which separates is filtered off with suction, washed with benzene and the benzene solution is evaporated. The residue is triturated with petroleum ether, taken up in hot benzene, filtered and carefully precipitated with ligroin. After recrystallization from ligroin 2 g., i. e. 60% of the theoretical, of 2[β(β'-dibenzylamino-ethoxy)-ethoxy]-benzamide of melting point 98 to 100° C. are obtained. The compound is readily soluble in most organic solvents. By dissolving the base in 2 N hydrochloric acid the hydrochloride is obtained which melts at 174 to 181° C. when recrystallized from ethanol.

*Analysis.*—Calc.: C, 68.09%; H, 6.63%; N, 6.35%. Found: C, 68.00%; H, 6.61%; N, 6.23%.

Example 9

2 g. of 2[β(β'-diethylamino-ethoxy)-ethoxy]-benzamide, 1.2 g. of ethyl iodide and 10 cc. of benzene are heated in a tube for fourteen hours to 140° C. The desired quaternization can also be effected however by boiling on the water bath. The oil which separates crystallizes after some time. It is filtered off with suction. Crude yield: quantitative. After recrystallization from 20 cc. of ethanol {2[β(β'-triethylammoniumethoxy)-ethoxy]-benzamide}-iodide is obtained as slightly yellowish crystals of melting point 149 to 153° C. The compound is very readily soluble in cold water, boiling methanol and ethanol and practically insoluble in boiling isopropanol, acetone and ethyl acetate.

*Analysis.*—Calc.: N, 6.42%; I, 29.08%. Found: N, 6.30%; I, 28.85%.

2.9 g. of 2[β(β'-diethylamino-ethoxy)-ethoxy]-benzamide and 1.7 g. of benzyl bromide are converted by heating in 15 cc. of benzene in a manner similar to that described in the above example into 2[β(β'-benzyl-diethyl-ammoniumethoxy)-ethoxy]-benzamide-bromide.

Example 10

{2[β(β' - triethylammoniummethoxy) - ethoxy]-benzamide}-iodide is also obtained by reacting 8 g. of 2[β(β'-chlorethoxy)-ethoxy]-benzamide with 6 g. of triethylamine in 40 cc. of benzene in a tube at 100 to 110° C. and treating the {2[β(β' - triethylammonium - ethoxy)-ethoxy]-benzamide} chloride which is first obtained with 7.0 g. of sodium iodide in 120 cc. of acetone.

Example 11

15 g. of 2[β(β'-chlorethoxy)-ethoxy]-benzoic acid methyl ester are treated with an excess of ethanolic or aqueous ammonia, whereupon 2[β(β' - chlorethoxy)-ethoxy]-benzamide of melting point 62 to 64° C. is obtained. Elevated temperatures should be avoided in this reaction, since otherwise 2[β(β'-amino-ethoxy)-ethoxy]-benzamide and also some bis-[β(β'-2-aminocarbonyl-phenoxy-ethoxy)-ethyl]-amine are formed.

Example 12

3.45 g. of β[β'-2-aminocarbonyl-phenoxy-ethoxy]-ethyl-N.N-diethylamino salt of 2[β(β'-sulpho-ethoxy)-ethoxy]-benzamide are obtained by reacting 1.68 g. of 2[β(β' - diethylamino - ethoxy) - ethoxy]-benzamide with 1.74 g. of 2[β(β'-sulpho-ethoxy)-ethoxy]-benzamide or by reacting 1.9 g. of 2[β(β'-diethyl-aminoethoxy)-ethoxy]-benzamide hydrochloride with 1.87 g. of the sodium salt of 2[β(β'-sulpho-ethoxy)-ethoxy]-benzamide in 90 cc. of absolute ethanol and following evaporation to dryness. In the latter case the crude salt can be freed completely from the accompanying sodium chloride by dissolving in a minimum quantity of absolute ethanol, filtration from the sodium chloride and subsequent evaporation to dryness. The new salt which forms a viscous mass is readily soluble in water, methanol and ethanol.

Example 13

10 g. of 2[β(β'-diethylamino-ethoxy)-ethoxy]-benzamide are dissolved in 150 cc. of ether and somewhat less than an equivalent amount of etheric hydrogen chloride added. The precipitated oily 2[β(β' - diethylamino-ethoxy) - ethoxy] - benzamide - hydrochloride crystallizes after some standing. It is recrystallized from i-propanol. The new salt forms colorless prisms melting at 152 to 153° C. It is readily soluble in water and ethanol. Yield: pure material: 8 g.

In the same manner as described above 2 g. of 2[β(β'-N-piperidino-ethoxy)-ethoxy]-benzamide and somewhat less than an equivalent amount of etheric hydrogen chloride leads to the hydrochloride of 2[β(β'-piperidino-ethoxy)-ethoxy]-benzamide. This new salt melts at 140° C. It is readily soluble in water and ethanol. It can be recrystallized from i-propanol.

In a manner analogous to that described above all the basic derivatives of salicylic acid amide which are described in the foregoing examples can be transformed into its water soluble hydrochlorides.

What we claim is:

1. The new chemical compound of the formula

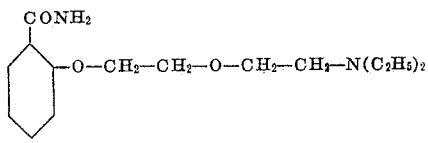

2. New chemical compounds selected from the group consisting of ethers of salicylic acid amide, and salts of said ethers with inorganic and organic non-toxic acids, the said ethers having the general formula

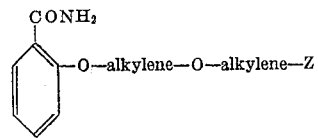

wherein alkylene represents lower alkylene radicals, and Z represents a radical selected from the group consisting of a di-lower amino radical, a pyrrolidino radical, a morpholino radical, and an α-methyl-piperidino radical.

No references cited.